(12) United States Patent
Douglas et al.

(10) Patent No.: US 6,719,236 B1
(45) Date of Patent: Apr. 13, 2004

(54) STORAGE SPOOL WITH COILED LINER

(75) Inventors: Wayne Antoine Douglas, Akron, OH (US); Donald Chester Kubinski, Medina, OH (US); John Patrick Roman, Cuyahoga Falls, OH (US); Matthew Ray Cappelli, Canal Fulton, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 09/979,748

(22) PCT Filed: Sep. 23, 1999

(86) PCT No.: PCT/US99/22241
§ 371 (c)(1),
(2), (4) Date: Nov. 16, 2001

(87) PCT Pub. No.: WO01/21520
PCT Pub. Date: Mar. 29, 2001

(51) Int. Cl.[7] .................................................. B65H 18/08
(52) U.S. Cl. .................. 242/536; 242/530.2; 242/602.3
(58) Field of Search ............................... 242/536, 530.2, 242/602.3, 533.8

(56) References Cited

U.S. PATENT DOCUMENTS

| | | | | | |
|---|---|---|---|---|---|
| 2,325,823 | A | * | 8/1943 | Wilson | 242/536 |
| 2,608,357 | A | * | 8/1952 | Brearton | 242/536 |
| 3,547,370 | A | * | 12/1970 | Karl | 242/536 |
| 5,547,145 | A | * | 8/1996 | Pagano et al. | 242/536 |
| 5,641,132 | A | * | 6/1997 | Bardy | 242/536 |
| 5,695,145 | A | * | 12/1997 | Wacht et al. | 242/348 |
| 5,794,885 | A | * | 8/1998 | Husek et al. | 242/533.8 |
| 6,330,984 | B1 | * | 12/2001 | Barker et al. | 242/536 |
| 6,416,013 | B1 | * | 7/2002 | Benzing, II | 242/536 |

FOREIGN PATENT DOCUMENTS

| | | | | |
|---|---|---|---|---|
| EP | 621124 A1 | * | 10/1994 | B29D/30/52 |
| JP | 61111261 A | * | 5/1986 | B65H/18/08 |

* cited by examiner

Primary Examiner—Kathy Matecki
Assistant Examiner—Sang Kim
(74) Attorney, Agent, or Firm—Brouse McDowell; Roger D. Emerson (57) ABSTRACT

A strip component (12) is carried by a liner (52) into a storage spool (24) having spiral grooved flanges (36, 38) for edges of the liner (52) which are guided into the grooves by guide rods (66, 74) which do not interfere with the transporting of the strip component (12) into and out of the spool (24).

18 Claims, 8 Drawing Sheets

STORAGE SPOOL WITH COILED LINER

TECHNICAL FIELD

This invention relates to a method and apparatus for building a tire including storing strip material, such as tire tread or sidewalls after extrusion and before application to an unvulcanized tire without deforming the strip material while it is being transported and is in storage.

BACKGROUND OF THE INVENTION

Heretofore, strip material for building a tire has been carried on a liner and stored on a spool with the individual layers of liner separating the individual layers of strip material. The weight of the outer layers of the strip material was carried by the inner layers of strip material and has deformed the inner layers. This has been especially undesirable when the strip material had a predetermined cross sectional profile shape, as in the case of a tread or sidewall of a tire.

It has been proposed in Japanese Patent A 61111261 to coil a liner in spiral slots of the flanges of a winding spool and during the winding of the liner feeding an extruded tire sidewall into the pocket between the layers of the liner to prevent deformation of the sidewall. In order to guide the liner into the spiral slots, the liner was reduced in width by pulling it through a carved former. This precluded using the liner to transport the sidewall into or out of the spool. Accordingly, the sidewall was not provided with any support from an extruder spaced from the spool to a position within the spool on the coiled liner. This is not desirable because it permits stretching and uncontrolled deformation of the sidewall between the extruder and the spool. Uncontrolled stretching of the sidewall is also a problem during transporting of the sidewall from the spool to a conveyor during unloading of the spool. This is especially a problem with other strip components for tires where uniformity of the strip components is necessary to provide tires which meet the high standards required at this time.

SUMMARY OF THE INVENTION

The present invention provides for storing and transporting a strip component in a spool having a hub and flanges with spiral grooves on the inner faces of the flanges. Edges of a liner are pulled into the spiral grooves in the flanges of the spool and the liner coils form a pocket in which the strip material is supported and protected. The edges of the liner maintain the liner coils in spaced relation so that the strip material is not compressed or deformed. The liner is made of a material which is stiff enough to support the strip material when it is suspended between the interfaces of the flanges and has sufficient resiliency so that the edges can bend and spring into the spiral grooves of the flanges during winding of the liner on the spool. This resilience of the liner permits removal of the liner edges from the spiral grooves as it is unwound from the spool. By supporting the liner in a coiled configuration in the grooved flanges of the spool, the liner is held in the shape of a hoop which provides increased strength to support the strip material.

Guides are provided to engage the edges of the liner before it enters the spool for bending the edges of the liner in a direction normal to the line of travel of the liner and urging the edges into the spiral grooves. The guides do not obstruct the passage of the liner into the pocket of the spool and therefore the liner may be utilized to support and transport the strip material from an extruder or other strip forming apparatus to the spool in a supported condition. This is highly desirable to maintain the shape and dimensions of the strip material especially when it is still in a heated condition. The liner may also be used to support and transport the strip material during unloading of the spool.

According to an aspect of the invention, there is provided a method of storing strip material in a spool without compressing portions of the strip material underlying other portions of the strip material comprising:

a. attaching a first end of a liner to the spool, the spool having spaced-apart flanges with spiral grooves in the axially inward opposing surfaces of the flanges for receiving edges of the liner, b. wrapping a second end of the liner around a liner storage spool, characterized by;

c. depositing the strip material on the liner, d. guiding the edges of the liner into the spiral grooves forming spaced-apart coils while carrying the strip material into space between said coils.

According to another aspect of the invention, there is provided apparatus for loading and storing strip material in a spool rotatably mounted on a supporting structure, the spool comprising a generally cylindrical core having axially outer ends and an axis, first and second flanges having an axially inner surface and an axially outer surface, and being fixedly attached to one of the axially outer ends of the core and each inner surface having a spiral groove extending radially outwardly from a radially inward starting point on each of the flanges near an interface of the core and the flanges, an elastically deformable liner having elastically deformable edges characterized by a pair of guide rods positioned adjacent each inner surface for engagement with the edges to selectively guide the edges into the grooves providing an unobstructed center portion of the liner for carrying the strip material into the spaces between overlapping convolutions of the liner.

DETAILED DESCRIPTION OF THE INVENTION

Figure 1:
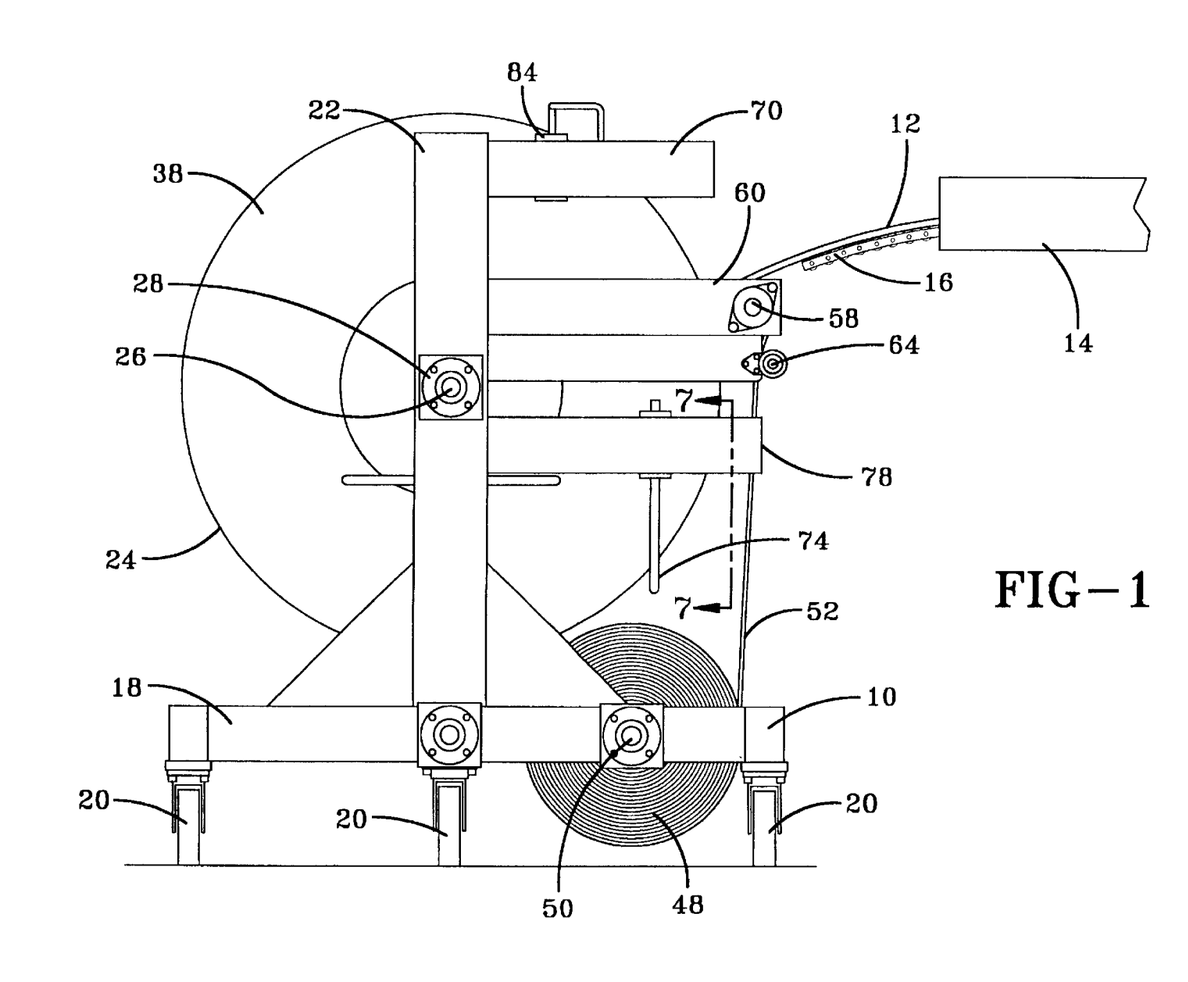
FIG. 1 is an elevation of a storage and transport cart in position for receiving an extruded tread from an extruder and carrying the tread on a liner guided into spiral grooves in flanges of a storage spool carried by the cart.

With reference to FIG. 1, a storage and support cart is shown for storing a strip of material, such as a tread 12 for a tire, which may be extruded from an extruder 14, located in a position where the cart 10 is rolled close enough to receive the tread from a conveyor 16 extending to a position over the cart. The transport cart 10 has a frame 18 supported on rollers 20. A pair of vertical spaced apart stanchions 22 is mounted on the frame 18. A spool 24 having a spool shaft 26 is rotatably mounted in bearings 28, supported by the stanchions 22.

Figure 2:
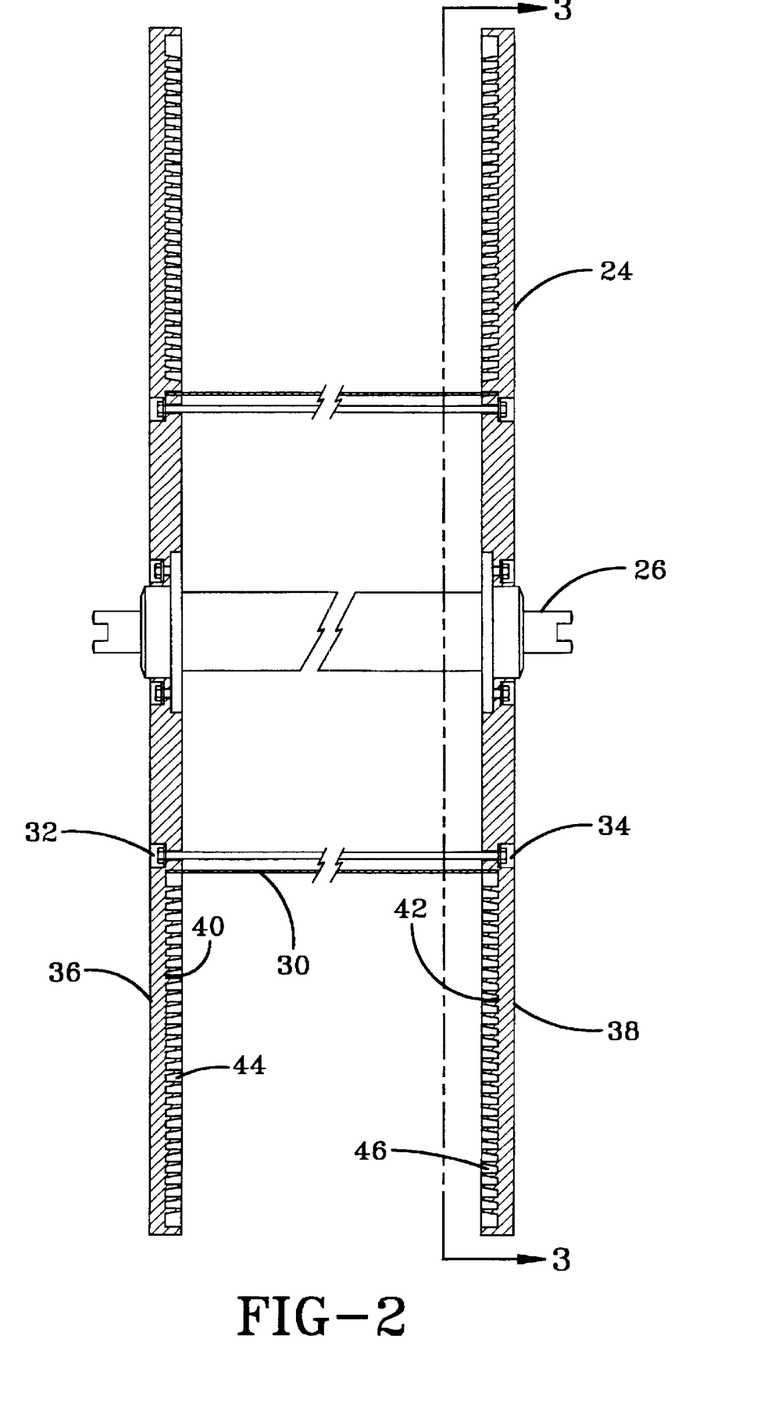
FIG. 2 is a sectional view of the spool showing the spiral flanges.
Figure 3:
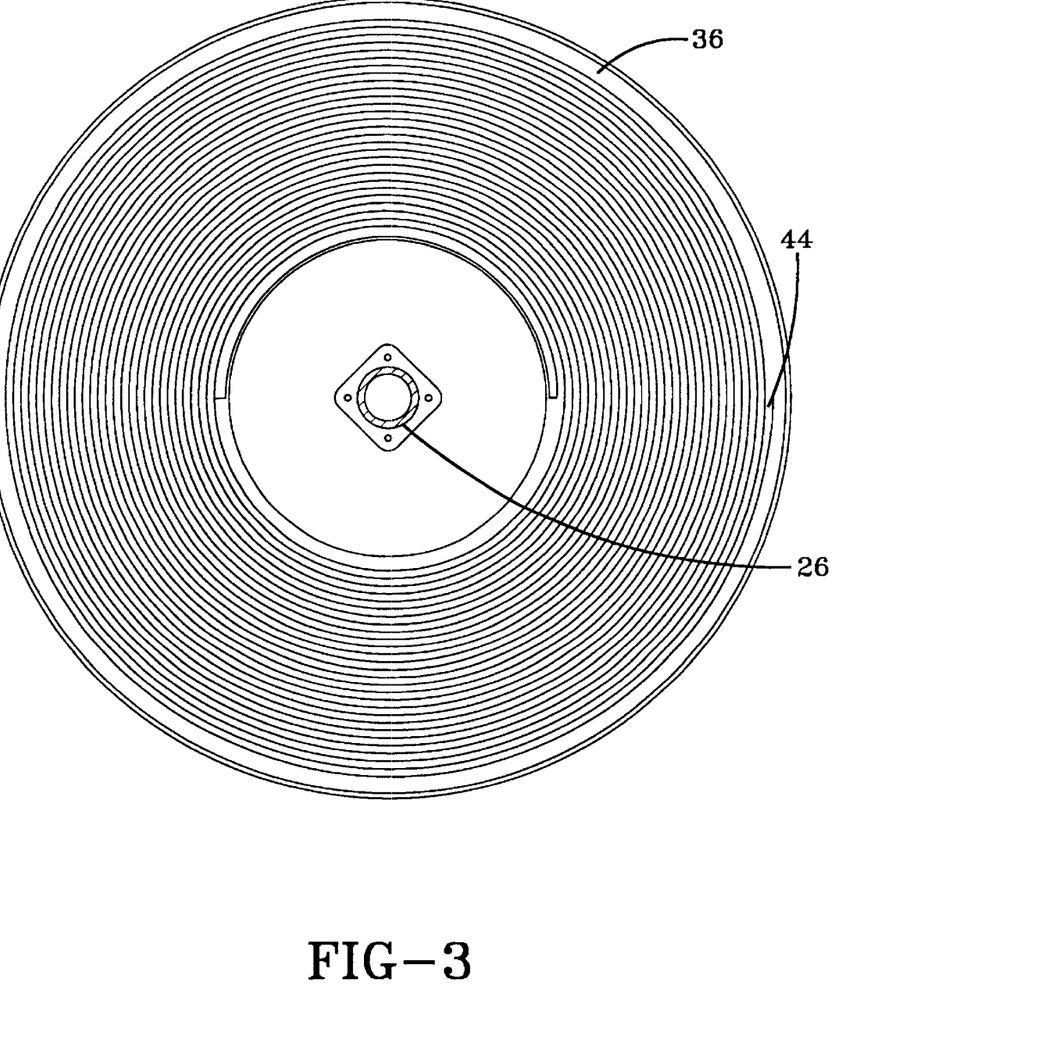
FIG. 3 is an elevation showing the spiral grooves in one of the flanges.

The spool 24 has a generally cylindrical core 30 with axially outer ends 32 and 34 fastened to the flanges 36,38 of the spool 24, inner faces 40,42 of the flanges 36,38 each has a spiral groove 44,46 extending radially outwardly from a radially inward starting point on each of the flanges 36,38 near an inner face of the core 30 and the flanges 36 and 38. This is shown in the cross section of the spool 24 in FIG. 2. A detailed view of the spiral groove 44 in the flange 36 is shown in FIG. 3.

Referring again to FIG. 1, a storage roll 48 is mounted on the frame 18 and has a shaft 50 engageable with a suitable drive means for rotating the roll to wrap a liner 52 around the roll prior to loading the spool 24. Preferably the liner 52 is an elastically deformable material having elastically deformable edges 54 and 56.

A bridge roller 58 is supported on beams 60,62 mounted on the stanchions 22 at a position adjacent the spool for guiding the liner 52 to the spool 24. A stripper roller 64 may be mounted under the bridge roller 58 to facilitate stripping of the treads 12 from the bridge roller when unloading the tread 12 from the spool 24.

Figure 4:
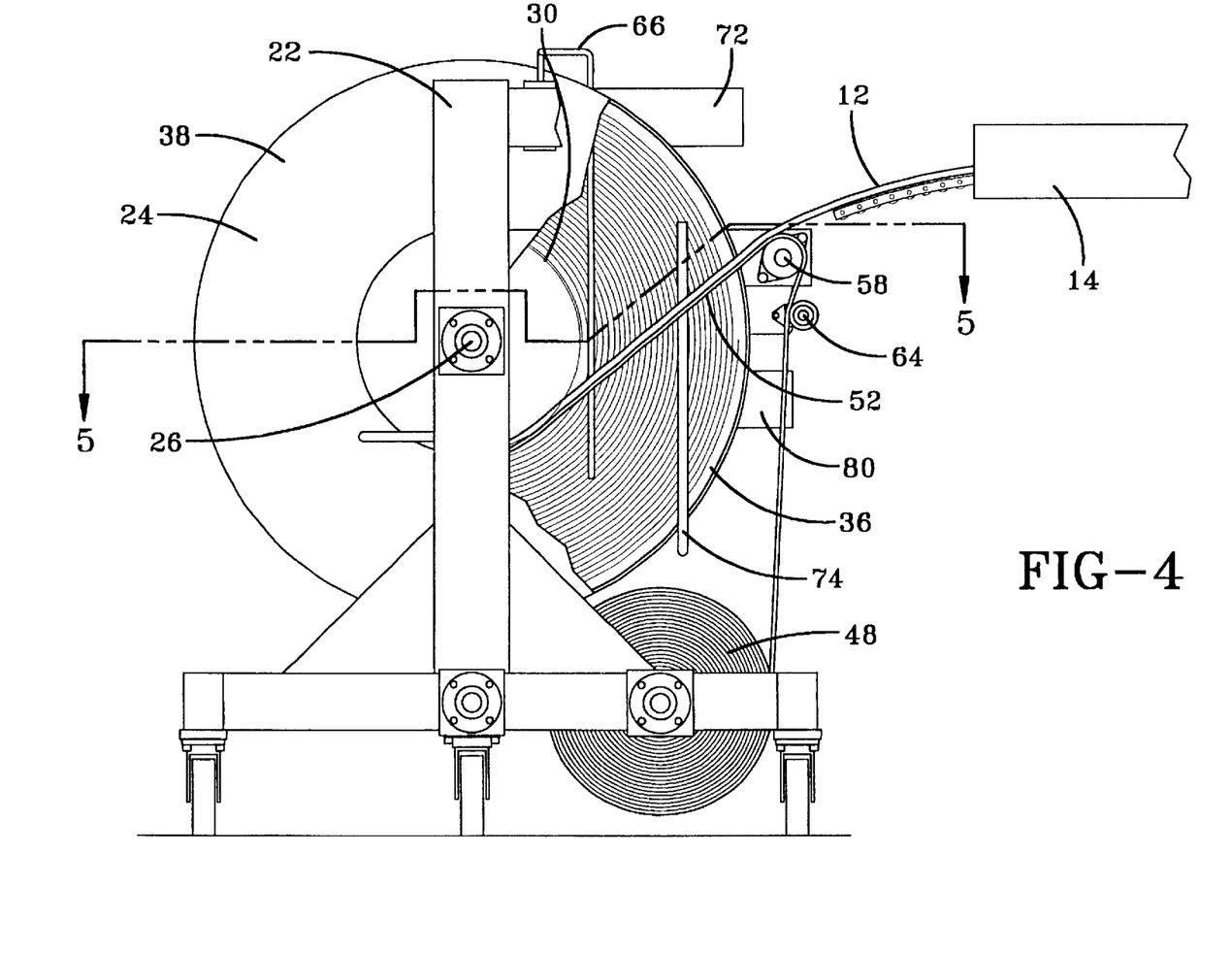
FIG. 4 is an enlarged fragmentary elevation of the spool and guide rods shown in FIG. 1 with one of the spool flanges and the guide supporting arms and beams broken away to show the positions of the guide rods, the liner and the tread at the beginning of the wind up process.
Figure 5:
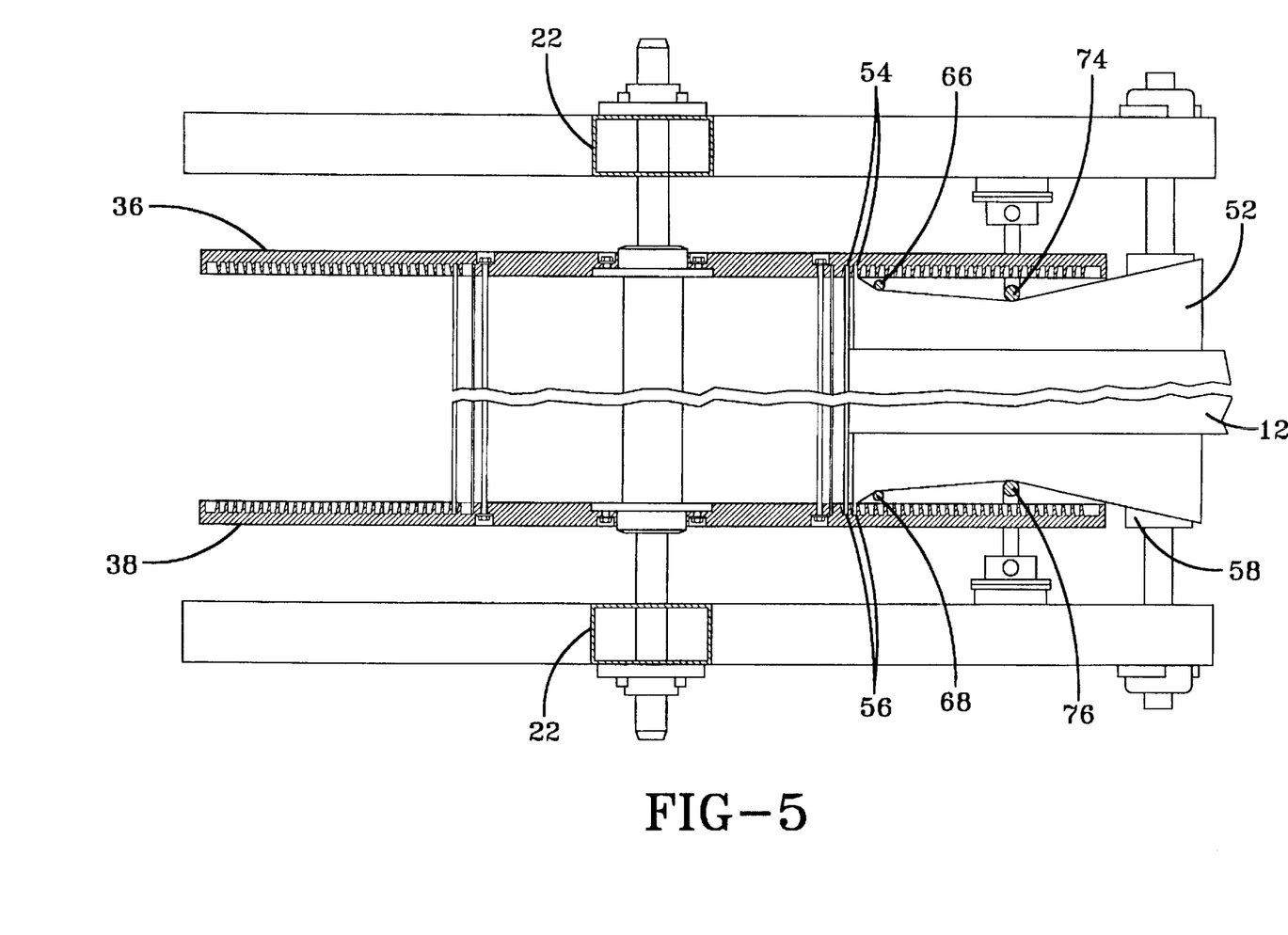
FIG. 5 is a sectional view taken along the line 5—5 in FIG. 4 showing the position of the guide rods and the tread on the liner in the empty position of the spool.
Figure 6:
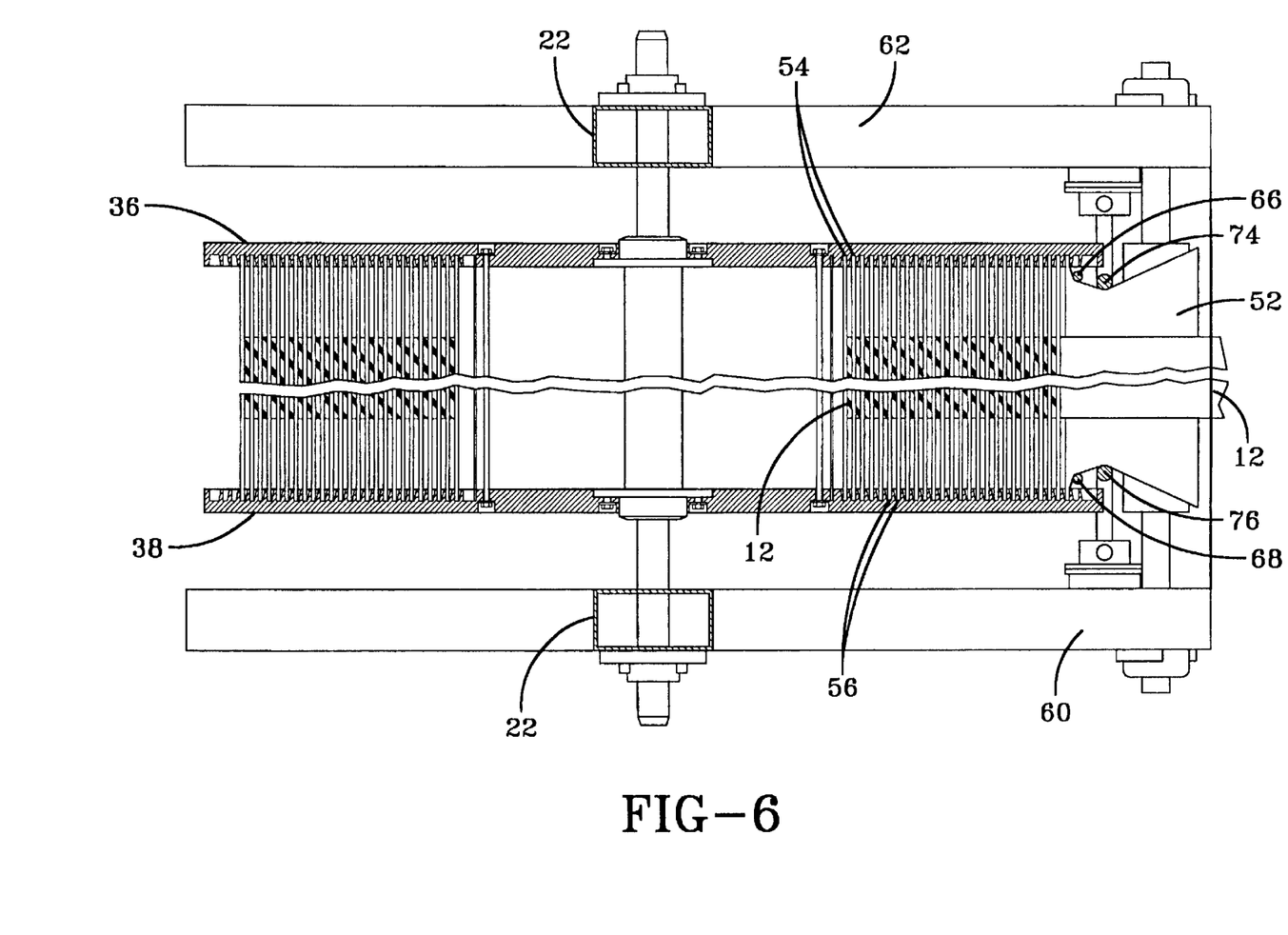
FIG. 6 is a view like FIG. 5 showing the position of the guide rods and the tread on the liner in the full position of the spool.

Referring to FIGS. 4 and 5, the position of the spool 24 in the empty condition is shown. The liner 52 extends from the storage roll 48 past the stripper roll 64 and over the bridge roller 58 in between the spool flanges 36 and 38 to the core 30 where it is fastened to the core by suitable means. A suitable power means (not shown) is attached to the spool shaft 26 for rotating the spool in a clockwise direction. The tread 12, is extruded from the extruder 14 and carried by the conveyor 16 to a position where the liner 52 passes over the bridge roller 58. The tread 12 is then deposited on the liner 52 and carried to a position spaced from the surface of the core 30 where the edges 54,56 of the liner are in engagement with the grooves 44,46 of the flanges 36 and 38. This storing of the tread 12 between the coils of the liner 52 continues until the spool 24 is filled and tread 12 is coiled in the spool.

Figure 7:
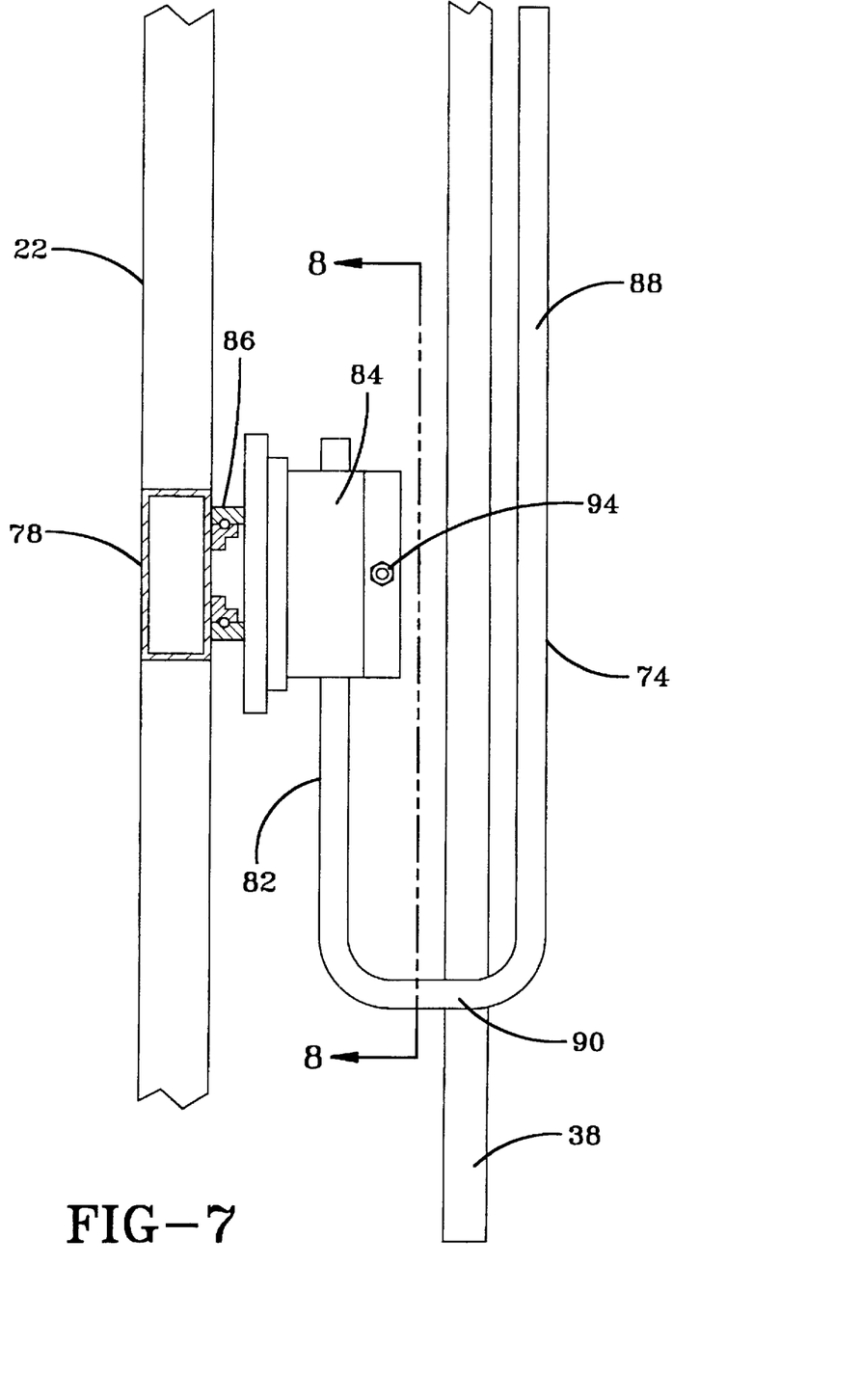
FIG. 7 is a fragmentary sectional view of one of the guide rod mountings taken along 7—7 in FIG. 1.
Figure 8:
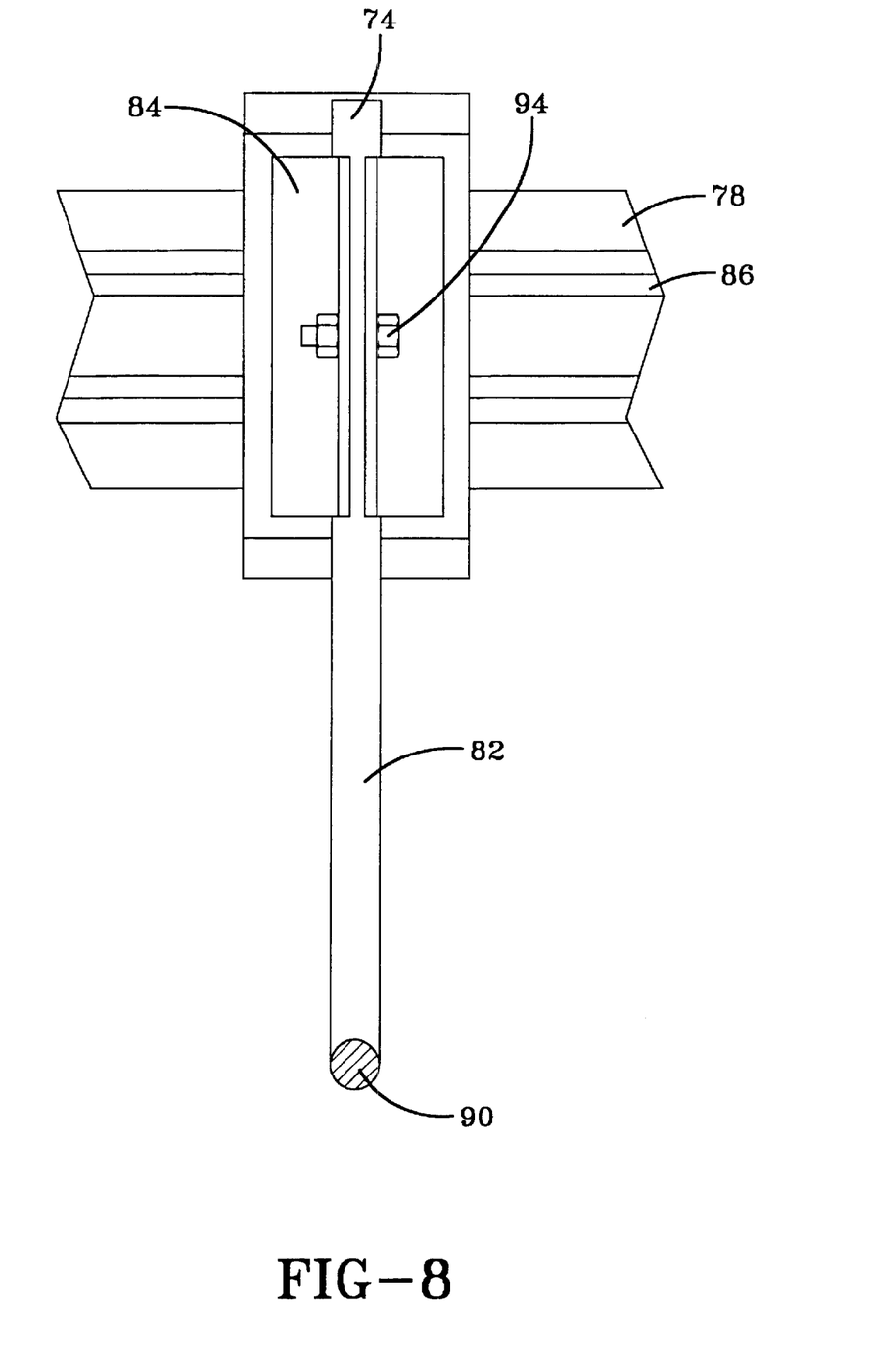
FIG. 8 is a fragmentary elevation of the mounting taken along line 8—8 in FIG. 7.

In accordance with this invention, a first pair of guide rods 66,68 is slidably mounted on upper arms 70,72 attached to the stanchions 22. A second pair of guide rods 74,76 is fastened to a lower arms 78 and 80 attached to the stanchions 22. Referring to FIGS. 7 and 8, the mounting of one of the second pair of guide rods 74 on the lower arm 78 is shown in detail to illustrate how the other guide rods 76 of the second pair and the first pair of guide rods 66,68 are mounted for adjustment. The rod 74 is U-shaped and has a supporting end 82 clamped in a flange clamp 84 mounted on a slide 86 fastened to the lower arm 78 attached to one of the stanchions 22. A guiding end 88 of the rod 74 is positioned between the spool flanges 36,38 and connected to the supporting end 82 by a bent portion 90 which extends around the edge of the spool flange 38. The flange clamp 84 has an adjusting screw 94, which may be turned to clamp the rod or release the clamping pressure to permit adjustment of the rod vertically or rotationally. The vertical adjustment may be desirable to remove the rod 74 or insert the rod during assembly. The rotation of the rods 74 may be desirable to position the guiding end 88 at a desired distance from the spool flange 38 for guiding the edges of the liner 52. The slide 86 provides for movement of the rod in a generally radial direction towards or away the core 30.

In operation the spool 24 is rotated in a clockwise direction as shown in FIG. 7 by a power means attached to the spool shaft 26 in a manner well known in the art of tire component transport carts. The liner 52, which is attached to the core 30 of the spool, is then wrapped around the core. The edges of the liner 52 are guided into the spiral grooves 44,46 in flanges 36,38 by the rods 66,68 and 74,76 which are positioned adjacent the inner faces of the flanges and separate the edges from the inner faces as the liner is pulled into the space between the flanges. When the liner 52 reaches a point past the second pair of rods 74,76 the edges, which are adjacent to the spiral grooves 36,38 of the flanges, are guided into the grooves. At this time, the liner 52 is also shaped in a cylindrical configuration providing rigidity and hoop strength for supporting the tread 12 positioned between the coils of the liner 52. The liner 52 is fed from the liner storage roll 48 on the cart 10 over the bridge roller 58 into the spool 24. The tread 12 is deposited on the liner 52 after it passes over the bridge roller 58 and has tread edges which are spaced from the edges of the liner 54,56 so that even though the rods 66,68,74,76 reduce the width of the liner for feeding the edges into the spiral grooves 44,46, the tread 12 is not deformed. Between the bridge roller 58 and the spool 24 the tread 12 is supported to prevent stretching or other deformation of the tread. After reaching the spool 24 the tread 12 is encapsulated between the coils of the liner 52 and supported in the spool 24 until it is to be applied to other tire components on a tire building drum (not shown). The storage cart 10 may be moved to a location adjacent the tire building drum and the tread 12 fed from the spool 24 to the bridge roller 58 by rotating the spool 24 in a counter clockwise direction. This may be accomplished by connecting the liner spool shaft 26 to a power source and rotating the spool 24 in a clockwise direction as shown in FIG. 1. The liner 52 supports and conveys the tread 12 out of the storage spool 24 with the edges of the liner being pulled out of the grooves and the tread 12 separated from the liner at the bridge roller 58 by passing the liner 52 over the stripper roll 64 adjacent the bridge roller. The tread 12 may be supported by server components after leaving the bridge roller 58 to maintain a predetermined shape.

During the above operation, the liner edges are initially urged away from the spiral grooves 44,46 of the flanges 36,38 with the second pair of guide rods 74,76. Then the edges are guided into the grooves 44,46 by the first pair of guide rods 66,68. Preferably, the second pair of guide rods 74,76 have a larger diameter which may be 1 inch (2.54 cm) and the first pair of guide rods 66,68 have a smaller diameter which may be 0.625 inches (1.59 cm). The smaller diameter of the first pair of rods 66,68 facilitate the entrance of the liner edges into the grooves 44,46.

During loading of the spool 24 the rods 66, 68, 74, 76 are pulled towards the center of the spool on the slides 86 by the movement of the liner 52 as it is wrapped around the spool 24.

Then as the liner 52 is guided into the spiral grooves 44,46 and the diameter of the coiled liner is increased, the liner surface bears against the guiding ends 88 of the rods and urges the rods in a direction radially outward of the spool. This facilitates the guidance of the liner edges 54,56 into the spiral grooves 44,46 and the storing of the tread 12 between the coils of the liner 52.

What is claimed is:

1. A method of storing strip material in a spool without compressing portions of said strip material underlying other portions of said strip material comprising:

a. attaching a first end of a liner to said spool, said spool having spaced-apart flanges with spiral grooves in the axially inward opposing surfaces of said flanges for receiving edges of said liner, b. supplying a second end of said liner from a liner storage roll, characterized by;

c. depositing a strip material on said liner, d. guiding said edges of said liner into said spiral grooves after depositing said strip material on said liner and then forming spaced-apart coils while carrying said strip material into said space between said coils.

2. The method of claim 1 further characterized by guiding said edges into said spaces between said coils by guide rods positioned between said edges and said flanges for bending said edges without distorting said strip material.

3. The method of claim 2 further characterized by said guide rods comprising a first pair of said guide rods positioned within the space between said flanges adjacent positions where said edges are bent for guiding said edges into said spiral grooves.

4. The method of claim 3 further characterized by said guide rods comprising a second pair of guide rods positioned radially outward of said first pair for bending said edges as said liner is pulled between said flanges.

5. The method of claim 4 wherein said first pair of guide rods and said second pair of guide rods are slidably mounted for movement radially of said spool between said flanges characterized by said liner edges pulling said guide rods radially inward of said flanges upon rotation of said spool and pushing said flanges radially outward as said liner fills said spiral grooves and is increased in diameter.

6. The method of claim 4 wherein said second pair of guide rods have a greater diameter than said first pair characterized by said second pair providing initial bending of said edges of said liner as said liner is pulled between said spiral grooved flanges and said first pair of guide rods for guiding said edges into said spiral grooves.

7. The method of claim 1 wherein said spool is mounted on a transport cart and said liner has a storage roll mounted on said cart further characterized by guiding said liner from said storage roll to a predetermined position prior to passage between said flanges and depositing said strip material on said liner at said position and transporting said strip material on said liner to said spool.

8. The method of claim 7 further characterized by transporting said strip material on said liner from said spool to said predetermined position during unloading of said spool.

9. The method of claim 1, further comprising the step of:

supporting said strip material as it is fed into said spool.

10. Apparatus for loading and for storing strip material in a spool rotatably mounted on a supporting structure, said spool comprising a generally cylindrical core having axially outer ends and an axis, first and second flanges having an axially inner surface and an axially outer surface, and being fixedly attached to one of said axially outer ends of said core and each said inner surface having a spiral groove extending radially outwardly from a radially inward starting point on each of said flanges near an interface of said core and said flanges, an elastically deformable liner having elastically deformable edges characterized by a first pair of guide rods positioned adjacent each said inner surface for engagement with said edges to selectively guide said edges into said grooves providing an unobstructed center portion of said liner for carrying said strip material into the space between overlapping coils of said liner.

11. Apparatus according to claim 10 further characterized by a second pair of guide rods positioned adjacent each said inner surface at positions between said first pair of guide rods and outer edges of said flanges for spacing said edges from each said axially inner surface as said liner is wrapped around said spool.

12. Apparatus according to claim 11 further characterized by at least one of said first pair of guide rods and said second pair of guide rods being slidably mounted on said supporting structure for movement of said first and second guide rods radially inward with said edges of said strip material and movement radially outward in response to contact of said guide rods with said liner as it coiled around said spool and the diameter increased.

13. Apparatus according to claim 10 further characterized by at least one of said first and second pair of guide rods being U shaped for mounting on supporting members positioned outside said spool wherein one end of each of said first and second guide rods is located between said flanges and an opposite end is located outside said flanges.

14. Apparatus according to claim 13 further characterized by said opposite end of each of said first and second guide rods is rotatably adjustable for selecting the distance between said one end of each of said guide rods to adjust the engagement pressure on said edges.

15. Apparatus according to claim 10 further characterized by said supporting structure comprising a transport cart having a frame supported on rollers, spaced stanchions for supporting said spool, a storage roll mounted on said cart for storing said liner, a bridge roller mounted on said cart at a predetermined position adjacent said spool for guiding said liner to said spool and receiving said strip material prior to passage of said liner into said spool whereby said strip material is supported while being wrapped on said spool.

16. Apparatus according to claim 15 further characterized by a spool shaft for connection to a first drive means for rotating said spool to coil said liner and strip material on said spool.

17. Apparatus according to claim 16 further characterized by a storage roll shaft for connection to second drive means to rotate said storage roll and pull said liner and said strip material out of said spool during unloading of said transport cart.

18. The apparatus of claim 10, wherein said strip material is supported as it is fed into said spool.

* * * * *